United States Patent
Gottfried Blackmore (10) Patent No.: US 9,479,018 B1
(45) Date of Patent: Oct. 25, 2016

(54) ELECTRICAL MACHINE HAVING LOCKED PERMANENT MAGNETS AND ROTOR SLICES

(75) Inventor: Tomas Enrique Gottfried Blackmore, Mexico City (MX)

(73) Assignee: POWER GROUP INTERNATIONAL CORPORATION, Laredo, TX (US)

( * ) Notice: Subject to any disclaimer, the term of this patent is extended or adjusted under 35 U.S.C. 154(b) by 316 days.

(21) Appl. No.: 13/456,868

(22) Filed: Apr. 26, 2012

Related U.S. Application Data (60) Provisional application No. 61/571,339, filed on Jun. 24, 2011.

(51) Int. Cl.
| | |
|---|---|
| H02K 1/27 | (2006.01) |
| H02K 1/28 | (2006.01) |
| H02K 21/12 | (2006.01) |
| H02K 1/30 | (2006.01) |
| H02K 21/14 | (2006.01) |

(52) U.S. Cl.
CPC .......... *H02K 1/278* (2013.01); *H02K 1/27* (2013.01); *H02K 1/28* (2013.01); *H02K 1/30* (2013.01); *H02K 21/12* (2013.01); *H02K 21/14* (2013.01)

(58) Field of Classification Search
CPC .......... H02K 1/27; H02K 1/278; H02K 1/28; H02K 1/30; H02K 21/12; H02K 21/14
USPC ............ 310/156.12, 156.19, 156.22, 156.36, 310/216.114, 156.21, 156.37
IPC ...................... H02K 1/27, 1/28, 21/12
See application file for complete search history.

(56) References Cited

U.S. PATENT DOCUMENTS

| | | | | |
|---|---|---|---|---|
| 3,320,454 | A * | 5/1967 | Kober | 310/268 |
| 3,743,873 | A * | 7/1973 | de Jong | H02K 19/103 310/114 |
| 4,433,261 | A * | 2/1984 | Nashiki et al. | 310/156.28 |
| 5,774,976 | A * | 7/1998 | Stark | 29/732 |
| 5,828,152 | A * | 10/1998 | Takeda | H02K 1/278 310/156.19 |
| 6,084,330 | A * | 7/2000 | Fisher et al. | 310/91 |
| 6,144,131 | A * | 11/2000 | Hollenbeck | H02K 1/276 310/156.53 |
| 2004/0189129 | A1* | 9/2004 | Takahashi | H02K 1/278 310/156.19 |
| 2005/0184611 | A1* | 8/2005 | Rinholm | H02K 1/278 310/156.21 |
| 2006/0158053 | A1* | 7/2006 | Aschoff et al. | 310/91 |
| 2009/0195101 | A1* | 8/2009 | Yang | H02K 1/278 310/156.22 |
| 2009/0309448 | A1* | 12/2009 | Yang et al. | 310/156.22 |
| 2009/0315423 | A1* | 12/2009 | Suzuki | H02K 1/28 310/156.12 |

* cited by examiner

*Primary Examiner* — John K Kim
(74) *Attorney, Agent, or Firm* — Egbert Law Offices, PLLC (57) ABSTRACT

An electrical machine has a drive shaft, a rotor affixed to the drive shaft and extending outwardly therefrom in which the rotor has at least one slice of a ferromagnetic material, a first plate positioned over and around the shaft and positioned adjacent to one side of the slice so as to have a portion extending radially outwardly beyond the circumferential surface of the slice, a second plate positioned over and around said shaft and positioned adjacent to another side of the slice so as to have a portion extending radially outwardly beyond the circumferential surface of the slice, and a magnet affixed to the circumferential surface in a location between the first and second plates.

6 Claims, 5 Drawing Sheets

ELECTRICAL MACHINE HAVING LOCKED PERMANENT MAGNETS AND ROTOR SLICES

CROSS-REFERENCE TO RELATED APPLICATIONS

The present invention claims priority from U.S. Patent Application Ser. No. 61/571,339, filed on Jun. 24, 2011, and entitled "Device and Method to Lock Permanent Magnets Within a Rotating Electric Machine".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to electrical machines having a stator and a rotor. More particular, the present invention relates to permanent magnet electrical machines wherein the permanent magnet is locked to the rotor of the machine. Additionally, the present invention relates to apparatus for locking the permanent magnet to an outer surface of a rotor slice of the electrical machine.

2. Description of Related Art Including Information Disclosed Under 37 CFR 1.97 and 37 CFR 1.98.

Permanent magnets make it possible to build electrical machines (otherwise known as "motors" and "generators") using magnets for field generation other than electro-magnets. Typically, the magnets are mounted on an inner rotor. However, outer rotor mounting can also be used. In a generator, the rotation of the magnetic field of the magnets on the rotor induces voltages and currents in the radially outward stator. In a motor, the magnets react to voltages and currents that are applied to the stator and cause rotation to the rotor.

Permanent magnet electrical machines are more compact and simpler. They require less maintenance than their electromagnetic counterparts by not requiring electromagnetic windings, along, with their associated connections, brushes and exciters. Modern rare earth magnets provide a dense source of magnetic flux than can windings. Such magnets also have higher flux and are able to withstand reasonably high temperatures. The resulting compact machines find application in structures where size, weight and efficiency are important. One application for such permanent magnet electrical machines is within the nacelles of wind turbines located at the top of high towers. Additionally, such permanent magnet electrical machines can be used as motors where space is at a premium.

One of the manufacturing issues related to permanent magnet machines is the mounting of the magnets onto the rotor. Magnets, especially those made from magnetic rare earth material, are heavy, brittle and hard. As such, if a magnet where to break free from the rotor, the stator and the rotor would be damaged by the impact of the debris.

Conventionally, magnets are mounted by bonding them onto the rotor surface. Although the adhesive is typically an epoxy, this alone is often inadequate in view of the powerful centrifugal forces on the magnets due to the rotor rotation. Additionally, such adhesives can also be inadequate in view of the magnetic attraction of the magnets to the ferromagnetic material or induced field of the stator, which is separated from the rotor magnets by only a small air gap.

Banding with a non-ferrous taped material (such as fiberglass, carbon fiber or KEVLAR™ tape) is used in a manner in which the tape is tightly wound around the circumference of the bonded magnets. Such magnets are also adhesively bonded to the rotor. This approach adds the thickness of the tape to the air gap distance between the magnets and the stator. This could cause a reduction of magnetic flux from the rotor to the stator and can also cause a blockage of cooling air in this gap.

Another conventional manner that is used to attach magnets is to embed them in the rotor structure so that they are held tightly within the ferrous structure of the rotor. This approach adds the embedded thickness to the distance between the magnets and the stator so as to cause a reduction of magnetic flux to the stator. It also causes a partial flux short-circuit within the rotor, since the embedding material is magnetic, so as to result in a further reduction of magnetic flux to the stator.

A further approach for attaching a magnet includes the use of clamps that are captured in cavities within the rotor. This approach requires precision components. The clamps and the cavities can also add to the cost and reliability of the machine.

Electric motors are characterized as "slotted" in which the rotor is segmented axially with coolant slots between the segments, "continuous" in which the rotor is not slotted, "solid-metal" in which the rotor or rotors segments are formed from solid ferromagnetic material, and "laminated" in which the rotor or rotor segments are formed from ferromagnetic lamination to minimize eddy current losses and the laminations are stacked to form the rotor or rotor segment.

Figure 1:
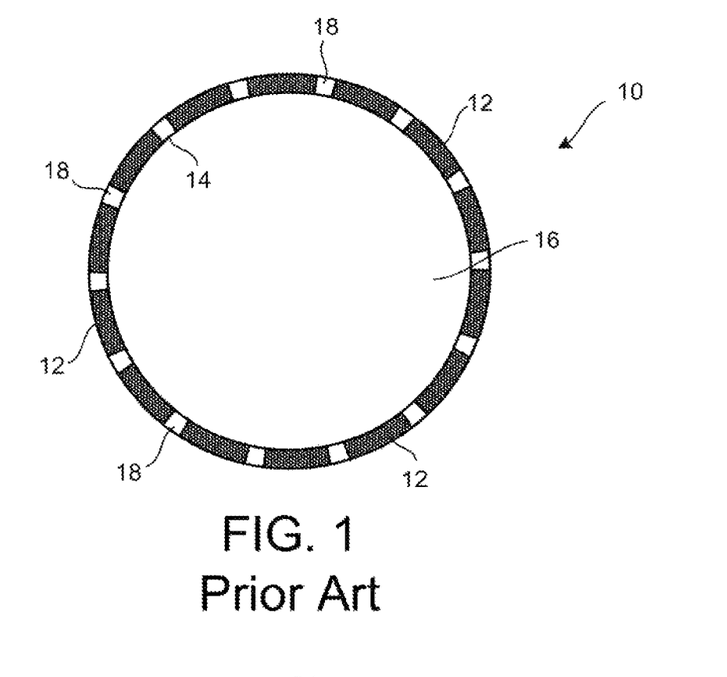
FIG. 1 is a cross-sectional view of a prior art electric motor having magnets surface-mounted onto the rotor.

FIG. 1 illustrates a conventional surface-mounted machine 10 where the magnets 12 are simply adhered to the outer surface 14 of the rotor core 16. Each of the magnets 12 are separated from each other using non-ferromagnetic spacers 18 between proximal magnets 12. The non-ferromagnetic spacers 18 are typically formed of a fiberglass material. A shaft can be provided for the rotation of the core 16. The approach shown in FIG. 1, by placing the magnet 12 closest to the surrounding stator across the rotor-stator gap, would be ideal if the adhesive were strong enough to counter the centrifugal force of rotation and any magnetic attraction to the stator. Generally, the simple approach does not sufficiently hold the magnets.

Figure 2:
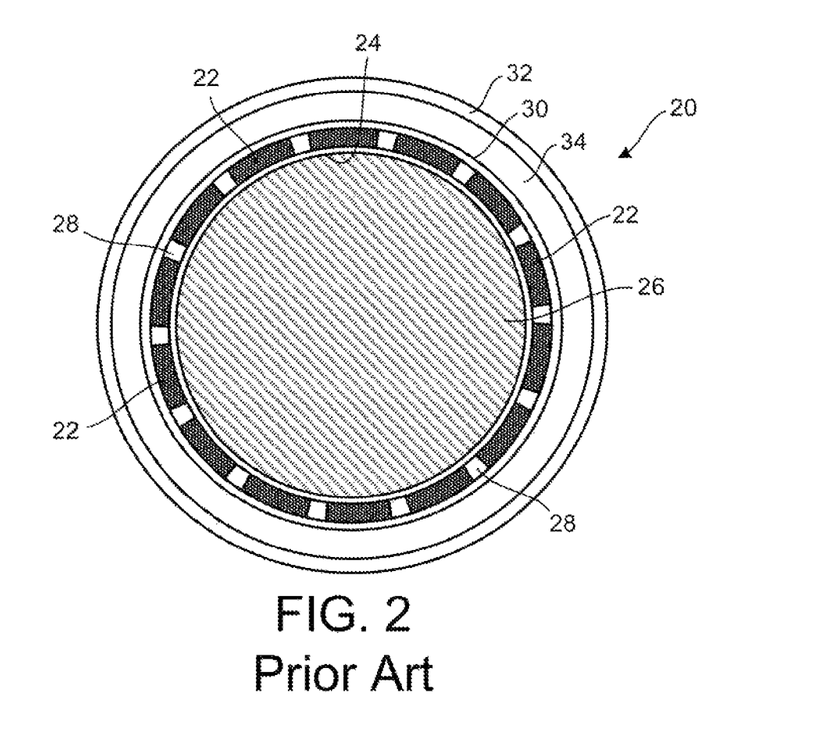
FIG. 2 is a cross-sectional view of a prior art electrical motor having magnets surface-mounted onto the rotor and having bands extending over the magnetic surface.

FIG. 2 illustrates a conventional banded machine 20 where the magnets 22 are adhered to the outer surface 24 of the rotor core 26. The magnets 22 are separated by non-ferromagnetic spacers 28 between the proximal magnets 22. The bands 30 are cinched around the magnets 22 to hold them in place. Although this approach actually worked, it places the band or bands 30 between the magnets 22 and the stator 32. As such, the band 30 will reside in the rotor-stator gap 34. As a result, in order to accommodate the bands, it may be necessary to increase the size of the gap 34. The magnetic flux efficiency would be correspondingly reduced.

Figure 3:
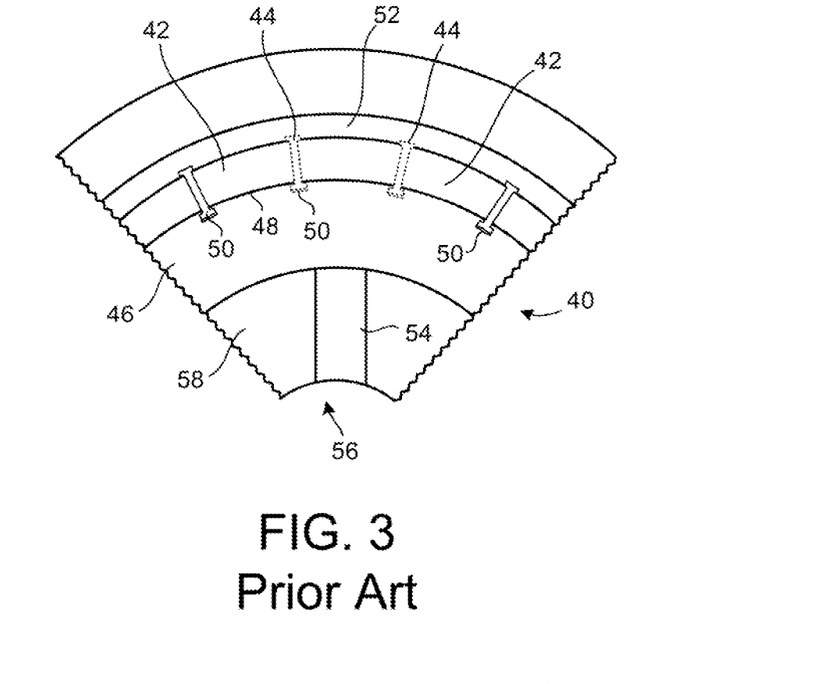
FIG. 3 is an illustration of a prior art electric motor having magnets surface-mounted onto the rotor and held in place by clamps.

FIG. 3 illustrates a conventional machine 40 that uses non-ferromagnetic clamps 44 captured in the rotor core 46. The clamps 44 overlap the magnets 42 to hold the magnets 42 to the surface 48 of the rotor core 46. Cavities 50 are provided on the rotor core 46 to capture the clamps 44. If the clamps 44 do not extend too far above the magnets 42 into the rotor-stator gap 52, the clamps 44 would not interfere with the flux generator. However, the formation of the cavities 50 within the rotor core 46 requires precise laminations for laminated rotors, or substantial milling to carve them out of solid-metal core rotors. The clamps 44 are also precision components. The insertion of these clamps 44 into the cavities 50 requires a great deal of precision during assembly.

FIG. 3 further illustrates the use of spider spokes 54 in order to attach the rotor core 46 to the shaft 56 while reducing the amount of material used for the rotor core 46. The resulting space 58 between the shaft 56 and the rotor core 46 is generally used as a passageway for machine coolant. The spider spokes 54 are welded onto or into the laminations of a laminated rotor machine. The spider spokes 54 can also be welded onto or cast as part of a solid-metal core material.

It is an object of the present invention to provide a rotor assembly whereby the permanent magnets can be attached to rotor slices so as to not interfere with the effective magnetic flux from the magnet of said stator.

It is another object of the present invention to provide a rotor assembly whereby the permanent magnets are securely mounted to a circumferential surface of the rotor slices.

It is still a further object of the present invention to provide rotor assembly whereby the permanent magnets can be attached in a simple and easy-to-assembly manner.

It is a further object of the present invention to provide at a rotor assembly which requires no machining of the rotor core or the permanent magnets.

These and other objects and advantages of the present invention will become apparent from a reading of the attached specification and appended claims.

BRIEF SUMMARY OF THE INVENTION

The present invention is an electrical machine comprising a drive shaft, a rotor affixed to the drive shaft and extending radially outwardly therefrom in which the rotor has at least one slice of ferromagnetic material, a first plate is positioned over and around the shaft and positioned adjacent to the first side of the slice, a second plate is positioned over and around the shaft and positioned adjacent to a second side of the slice, and a magnet affixed to the circumferential surface of the rotor slice in a location between the first and second plates. The first plate has a first portion extending radially outwardly beyond the circumferential surface of the slice. Similarly, the second plate also has a portion extending radially outwardly beyond the circumferential surface of the slice. The magnet has surfaces that are adhesively secured to the circumferential surface and to the portions of the first and second plates. The first and second plates are formed of a non-ferromagnetic material.

The magnets comprise a plurality of magnets affixed in spaced relationship to each other on the circumferential surface of the rotor slice. A plurality of non-ferromagnetic spacers are positioned in the respective spaces between adjacent magnets. The rotor slice, the first plate and the second plate have a plurality of aligned bolt holes formed through the thicknesses thereof. A plurality of bolts are respectively received by the plurality of aligned bolt holes so as to sandwich the rotor slice between the first and second plates.

In the present invention, the rotor slice includes a plurality of slices arranged in side-by-side relationship on the shaft. The plurality of slices are in spaced parallel planar relationship to each other. Each of the plurality of rotor slices has the first plate on one side thereof and the second plate on an opposite side thereof. In one embodiment of the present invention, a separator can be positioned between adjacent slices of the plurality of slices. Each of the plates is disk-shaped and of a planar configuration.

In one form of the present invention, each of the first and second plates has a plurality of notches extending inwardly from a periphery of the plates. The plurality of notches correspond in location generally to the respective spacers of the plurality of spacers. The plurality of magnets are affixed respectively to the non-notched surfaces at the periphery of the first and second plates.

It is another form of the present invention, the portion of the first plate includes a tab that is affixed to the rotor slice so as to extend radially outwardly beyond the circumferential surface of the rotor slice. The magnet is affixed on one side of the tab of the first plate. This tab is of a non-ferromagnetic material.

In still another embodiment of the present invention, the portion of each of the first and second plates include a pair of stubs affixed to one side of the slice so as to extend radially outwardly beyond the circumferential surface of the slice. The magnet is affixed on one side to the pair of stubs.

The foregoing section is intended to describe generally the nature of the present invention. It is understood that variations of the present invention can be made within the scope of the present invention that would differ from this description. As such, this section is not intended, in any way, to be limiting of the scope of the present invention. The present invention should only be limited by the following claims and their legal equivalents.

DETAILED DESCRIPTION OF THE INVENTION

Figure 4:
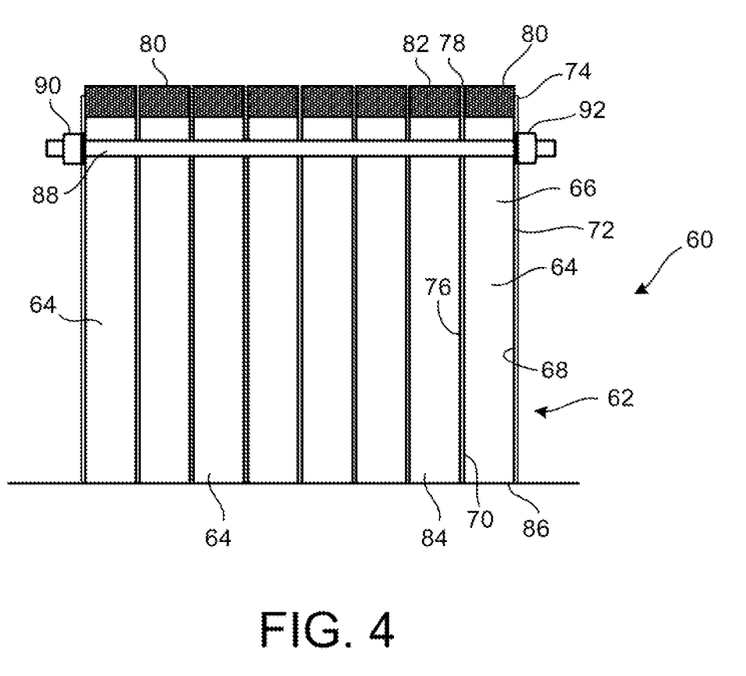
FIG. 4 is a side elevational view of the rotor assembly in accordance with the teachings of the present invention.

Referring to FIG. 4, there is shown the electrical machine 60 in accordance with the teachings of the present invention. The electrical machine 60 includes a rotor 62 having a plurality of rotor slices 64 arranged in side-by-side relationship. Each of the rotor slices 64 has a circumferential surface 66, a first side 68 and a second side 70. A first plate 72 is affixed to the first side 68 of the rotor slice 64. The first plate 72 has a portion 74 that extends upwardly behind the circumferential surface 66 of the rotor slice 64. A second plate 76 is affixed to the second side 70 of the rotor slice 64 so as to extend upwardly and to have a portion 78 extending radially outwardly of the circumferential surface 66. A permanent magnet 80 is affixed to the circumferential surface 66 and is affixed to the portions 74 and 78 of the respective plate 68 and 70. This construction can be utilized for all of the remaining rotor slices 64.

Within the concept of the present invention, the second plates 76 can be secured to the permanent magnet 80 and also can have a portion 78 secured to the permanent magnet 82. As such, as defined herein, the second plate 76 can reside against the second slice 70 of the rotor slice 64 and can also serve as the first plate residing against the first side of the rotor slice 84.

The rotor 62 can be suitably secured to a drive shaft so that the rotor 62 will rotate with a rotation of the drive shaft. Since the permanent magnets 80 are at the circumferential surface of each of the rotor slices 64, the centrifugal force will be greatest at the location such permanent magnets 80. As such, the adhesive securing of the permanent magnet 80 to the portions 74 and 78 of the plates 72 and 76 will adhere the permanent magnet into position in a safe and secure manner. The use of the non-ferromagnetic plates 72 and 76 would not interfere with the electromagnetic flux generated by the magnets 80. Since the portions 74 and 82 do not extend into the stator-rotor gap, they will provide an efficient way of maintaining the magnets 80 in their proper positions.

In FIG. 4, it can be seen that each of the rotor slices 64 and each of the plates will have a hole formed therethrough. These holes are suitably aligned so that a bolt 88 can extend therethrough. Suitable nuts 90 and 92 can be secured to the respective ends of the bolt 88 so as to properly sandwich the rotor slices 64 and the plates together.

As used herein, the portions 74 and 78 of the plates 72 and 76 do not extend beyond the magnets 80 and do not extend into the rotor-stator gap. The plates are made to slip and lock under the shaft 86. Since each of the plates 72 and 76 is of a non-ferromagnetic material, the portions 74 and 78 are also of such a non-ferromagnetic material.

Figure 5:
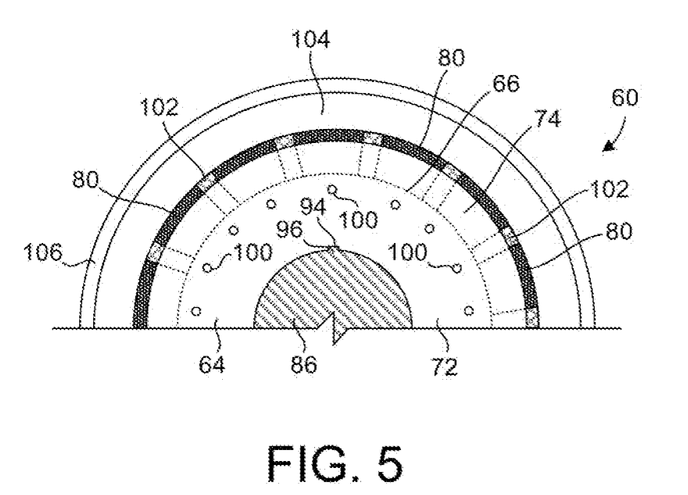
FIG. 5 is a cross-sectional view of the electrical machine in accordance with the teachings of the present invention.

FIG. 5 is a cross-sectional view of the electrical machine 60 with the plate 72 illustrated in a transparent fashion. In particular, it can be seen that the rotor slice 64 is affixed to the drive shaft 86. A keyway 94 is formed on the inner diameter of the rotor slice 74 so as to allow the rotor slice 64 to lock into the key 96 of the shaft 86. As such, the rotor slice 64 will rotate with a rotation of the drive shaft 86.

The plate 72 has a generally planar disk-shaped. The plate 72 has its portion 74 extending outwardly beyond the circumferential surface 66 of the rotor slice 64. The permanent magnet 80 is secured to the portion 74. The rotor slice 72 also has a plurality of bolt holes 100 formed in spaced relationship. The bolt holes 100 can be suitable for receiving the bolts 88 therethrough.

As can be seen on FIG. 5, there are a plurality of permanent magnets 80 that will be affixed to the portion 74 of the plate 72. Suitable non-ferromagnetic spacers 102 will be located between the adjacent permanent magnets 80. The spacers 102 can be formed of a fiberglass material.

Since the portion 74 of the plate 72 does not extend into the rotor-stator gap 104, it will not interfere with the flux that is generated relative to the stator 106.

Figure 6:
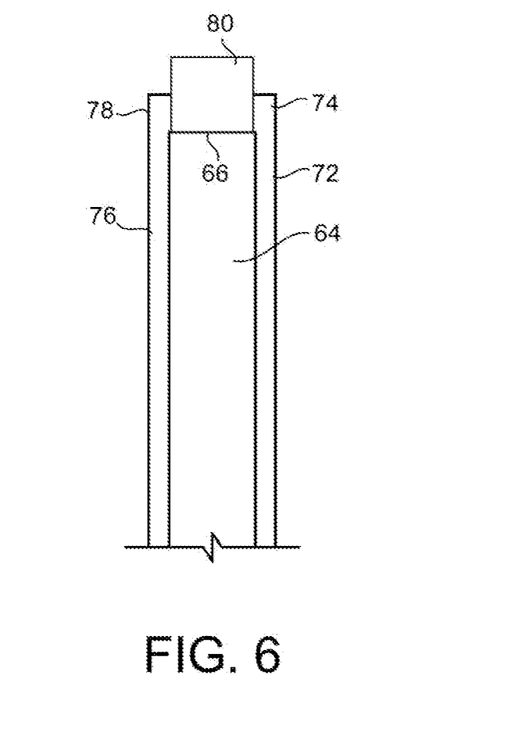
FIG. 6 is a detailed side view showing the arrangement of the first and second plates in relation to the magnet and the rotor slice.

FIG. 6 shows a detailed view of how the rotor slice 64 is sandwiched by the first plate 72 and the second plate 76. In particular, the first plate 72 has a portion 74 extending outwardly beyond the circumferential surface 66 of the rotor slice 64. The second plate 76 has the portion 78 extending beyond the circumferential surface 66 of the rotor slice 64. The permanent magnet 80 is adhesively secured the circumferential surface 66 and secured to the portions 74 and 78 of the first plate 72 and the second plate 76. As such, the permanent magnet 80 is securely maintained in place. The portions 74 and 78 can extend radially outwardly of the circumferential surface 66 for a distance that is suitable for properly securing the permanent magnet 80.

In order to make the rotor assembly 60 of the present invention, the plates are placed upon the shaft 86 and are separated by the rotor core slices 64 until the rotor length is complete. In this continuous rotor assembly 60, the plates of the neighboring rotor slices are shared. As such, only one plate is required per rotor slice. These spacers 102 or separators are both adhered to the portions 74 and 78 of the plates 72 and 76. Each of the rotor slices 64 is assembled together through the use of the bolts 88 that are fitted through the bolt holes 100.

Figure 7:
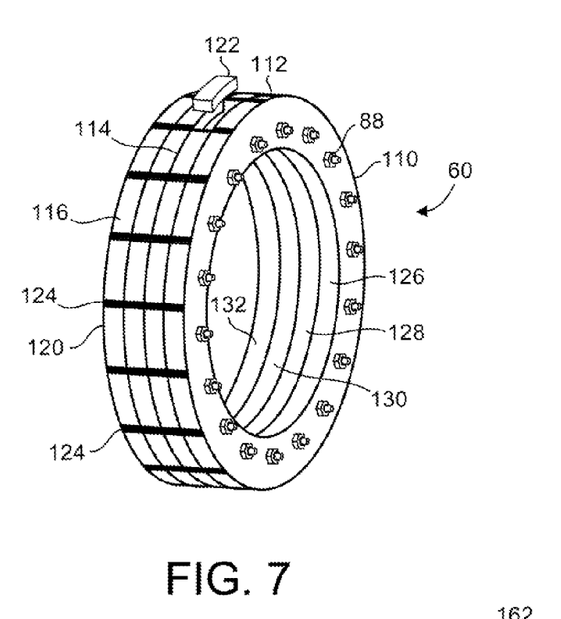
FIG. 7 is a perspective view of the rotor assembly of the present invention in accordance with the preferred embodiment of the present invention.

FIG. 7 is a perspective view of the rotor assembly 60. In particular, the rotor assembly 60 is illustrated as having plates 110, 112, 114, 116 and 120. The rotor slices are placed between each of the plates 110, 112, 114, 116 and 120. It can be seen that the permanent magnets 122 are positioned so as to reside against the portions of each of the plates 110, 112, 114, 116 and 120 that extend outwardly beyond the rotor slice. Additionally, non-ferromagnetic spacers 124 will be positioned between the adjacent ends of the permanent magnets 122.

With reference to FIG. 7, the rotor slice 126 is positioned between the plate 110 and a plate 112. The rotor slice 128 is positioned between the plate 112 and the plate 114. The rotor slice 130 is positioned between the plate 114 and the plate 116. Finally, the rotor slice 132 is positioned between the plate 116 and the plate 120. As such, this sandwiched configuration can be secured in a tight bundle through the use of a bolt 88.

Figure 8:
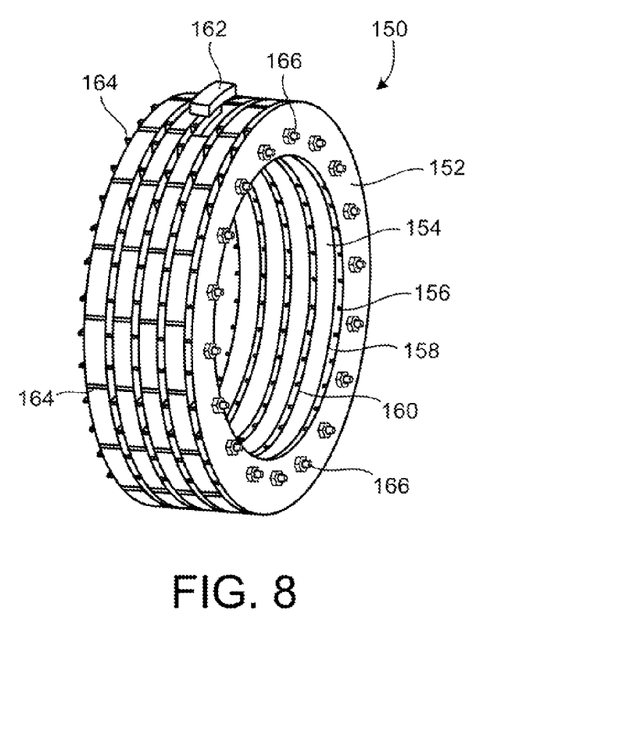
FIG. 8 is a perspective view of the rotor assembly of the present invention showing the use of separators between the permanent magnets.

FIG. 8 shows an alternative embodiment of the rotor assembly 150 of the present invention. In the rotor assembly 150, it can be seen that a pair of plates are associated with each rotor slice. The plate 152 is separated from rotor slice 154 by separators 156. The rotor slice 154 will have a plate 158 on one side and a plate 160 on the opposite side. Each of the plates will be separated from an adjacent plate of another rotor slice by similar separators 156. The permanent magnet 162 will be secured in a position between the plate associated with each rotor slice. Spacers 164 also are affixed to the outwardly extending portions of the respective plates and secured thereto. The embodiment of the rotor assembly 150 of FIG. 8 provides suitable channels for airflow between the rotor slices and between the permanent magnets. As such, the embodiment of FIG. 8 facilitates the ability to pass coolant. The bolts 166 are utilized so as to sandwich the various components of electrical machine 150 together.

Figure 9:
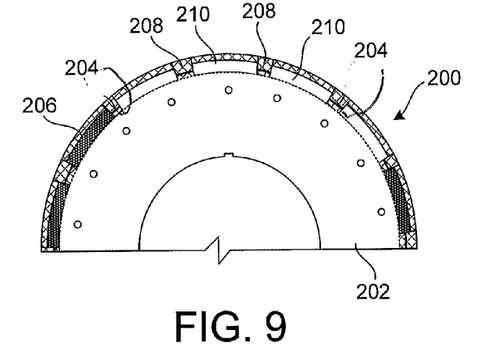
FIG. 9 is a cross-sectional view showing a notched plate as used with the rotor assembly of the present invention.

FIG. 9 shows an alternative embodiment of the electrical machine 200 of the present invention. In FIG. 9, the important difference is that the plate 202 includes notches 204 that are formed inwardly of the periphery 206 of the plate 202. As can be seen, the notches 204 generally correspond to the location of the spacers 208 between the respective permanent magnets 210. In this embodiment, this notched disk-shaped plate 202 reduces the amount of material for the plate. It can be seen that the periphery 206 can still be used so as to bond with the permanent magnet 210 while minimizing the amount of material in those areas in which the spacer 208 is provided.

Figure 10:
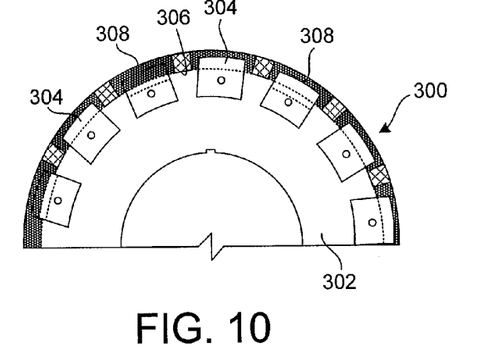
FIG. 10 is a cross-sectional view showing the use of tabs for the securing of the permanent magnets to the rotor surface.

FIG. 10 shows another alternative embodiment of the electrical machine 300 of the present invention. As can be seen in FIG. 10, the plate 302 has a plurality of tabs 304 affixed adjacent to the periphery 306 thereof. Each of the tabs 304 is spot-welded to the surface of the plate 302 so as to have a portion extending outwardly of the periphery 306. Each of the permanent magnets 308 can then be bonded to this outwardly extending portion of the respective tabs 304. Each of the tabs 304 is formed of a non-ferromagnetic material. The magnets 308 are adhered to the periphery 306 of the rotor slice 302 and to the tab 304, one per magnet.

Figure 11:
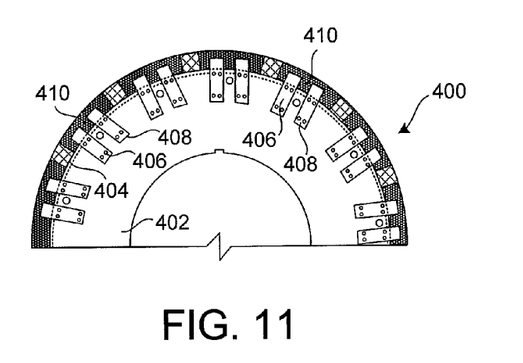
FIG. 11 is a cross-sectional view showing the use of stubs for the securing of the permanent magnets to the rotor surface.

FIG. 11 shows another alternative embodiment of the electrical machine 400 of the present invention. As can be seen in FIG. 11, the plate 402 has a periphery 404. A pair of stubs 406 and 408 are affixed, by welding, or by other means, to the rotor slice 402 so as to have a portion extending outwardly beyond the periphery 404 of the rotor slice 402. The permanent magnets 410 are respectively bonded to that portion of the stubs 406 and 408 that extend outwardly of the periphery 404 of the rotor slice 402. Each of the stubs 406 and 408 is formed of a non-ferromagnetic material.

The present invention offers an improved rotor assembly for retaining the permanent magnet onto the circumferential surface of the rotor slice. Tests were conducted on the strength of the positioning the permanent magnet through the use of the system of the present invention. Various forces were considered in determining the effectiveness of such a mounting arrangement. In particular, the forces include the centrifugal force due to the spin of the drive shaft, the magnetic attraction force of the magnet to the rotor core, the magnetic attraction force of the magnet to the stator across the rotor-stator gap, the adhesive bond between the magnet and the respective first and second plates, and the adhesive bond between the magnet and the circumferential surface of the rotor slice.

The magnetic attraction force to the circumferential surface of the rotor core slice, being a contact force, overcomes the attraction force to the stator across the rotor-stator gap. These magnetic forces are not considered and, because their net forces to hold the magnet to the circumferential surface of the rotor slice, not including these magnetic forces introduces an underestimation of the holding force.

The centrifugal force tending to pull the magnet from the circumferential surface of the rotor slice is in accordance with the following formula:

$$F_{centrifugal} = m_{magnet} r (l)^2$$

In this formula, $m_{magnet}$ is the mass of the magnet, r is the radius from the center from the center of the motor shaft to the center of the mounted magnet, and (l) is the rotor shaft rate in rad/s.

The adhesive force that is holding the magnet in place includes the shear force of the adhesion to the radially outwardly extending portions of the plates. The formula that represents this adhesive force is as follows:

$$F_{shear} = 2k_{epoxy\_shear} A_{extension}$$

In this formula, $A_{extension}$ is the area of the portion extending beyond the circumferential surface of the rotor slice in which the magnet is in contact with. The term $k_{epoxy\_shear}$ is the per unit area epoxy shear coefficient.

The tensile force of the adhesion of the circumferential surface of the rotor slice is in accordance with the following formula:

$$F_{tensile} = k_{epoxy\_tensile} A_{magnet\_base}$$

In which $A_{magnetic\_base}$ magnet base is the area of the magnet surface contact in the circumferential surface of the rotor slice, and $k_{epoxy\_tensile}$ is the per unit epoxy tensile coefficient.

Conservatively (ignoring the magnetic holding advantage), in order for a magnet to remain on the circumferential surface of the rotor slice, $F_{centrifugal}$ must be less than or equal to the sum of $F_{shear}$ and $F_{tensile}$. The following formula represents this relationship:

$$m_{magnet} r \omega^2 \leq 2k_{epoxy\_shear} A_{extension} + k_{epoxy\_tensile} A_{magnet\_base}$$

As such, this relationship can be solved for the maximum shaft rotation rate in accordance with the following formula:

$$\omega \leq \sqrt{\frac{2k_{epoxy\_shear} A_{extension} + k_{epoxy\_tensile} A_{magnet\_base}}{r m_{magnet}}}$$

This is a conservative (low) value since the net magnetic holding force is not included.

As an example, in current industrial applications, a generator can have magnets with the following values:
$m_{magnet}$=0.0311 slug (1 lbs)
$A_{extension}$=3.035 in²
$A_{magnet\_base}$=4.216 in²
The adhesive that is used (Loctite Hysol E-214HP) has the following values:
$k_{epoxy\_shear}$=3615 psi @ 100° C.
$k_{epoxy\_tensile}$=3660 psi @ 100° C.
The rotor has magnets mounted one foot from the shaft center and is designed to operate at 1200 rpm at 100° C. The conservative maximum motor rotation rated calculated as 10.3K rpm and the motor has a conservative rpm safety factor of 10,300/1200=8.6. Once the rotation rate is set at 1200 rpm, the following formula results:

$$m_{magnet} r \omega^2 \leq 2k_{epoxy\_shear} A_{extension} + k_{epoxy\_tensile} A_{magnet\_base}$$

490 lbs≤21950 lbs+14102 lbs

≤36052 lbs

This has conservative safety factor of 36052/490=73.5.

If the magnet were to be adhered only to the circumferential surface of the rotor slice, as in prior art of FIG. 1, the maximum rotation rate drops to 6435 rpm for a rpm safety margin of 5.3, and a force safety margin reduced to 14102/

490=27.8. As such, through an inexpensive and simple construction and assembly, the rotor assembly of the present invention provides for a substantial machine design margin that serves to retain the otherwise destructive magnets onto the rotor of the machine. The present invention avoids any interference with the magnetic flux that is generated between the stator and the rotor through the use of the permanent magnets.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An electrical machine comprising:
   a drive shaft;
   a rotor affixed to the drive shaft and extending radially outwardly therefrom, said rotor having a plurality of slices of a ferromagnetic material, each slice of said plurality of slices having a first side and a second side, each slice of said plurality of slices having a circumferential surface;
   a first plate positioned over and around said shaft in position adjacent to said first side of the slice, said first plate having a portion extending radially outwardly beyond said circumferential surface of the slice, said portion of said first plate being entirely planar and unperforated;
   a second plate positioned over and around said shaft and positioned adjacent to said second side of the slice, said second plate having a portion extending radially outwardly beyond said circumferential surface of the slice, said portion of said second plate being entirely planar and unperforated; and
   a magnet affixed to said circumferential surface in a location between said first and second plates, said magnet having outermost surfaces on opposite sides thereof, each of said outermost surfaces of said magnet being entirely planar, said portions of said first and second plates bearing in surface-to-surface relationship against said outermost surfaces of said magnet, said magnet having an exposed and uncovered surface opposite said circumferential surface, said plurality of slices being in spaced parallel planar relationship to each other, each slice of said plurality of slices having said first plate on one side thereof and said second plate on an opposite side thereof; and
   a plurality of separators positioned between adjacent slices of said plurality of slices so as to fix a distance between the adjacent slices.

2. The electrical machine of claim 1, said outermost surface of said magnet adhesively secured to said portions of said first and second plates.

3. The electrical machine of claim 1, each of said first and second plates being formed of a non-ferromagnetic material.

4. The electrical machine of claim 1, said magnet comprising a plurality of magnets affixed in spaced relation to each other on said circumferential surface, the electrical machine comprising: a plurality of non-ferromagnetic spacers positioned in the respective spaces between adjacent magnets.

5. The electrical machine of claim 1, the slice and said first plate and said second plate having a plurality of aligned bolt holes formed through a thickness of the slice, the electrical machine further comprising:
   a plurality of bolts respectively received by said plurality of aligned bolt holes so as to sandwich the slice between said first and second plates.

6. The electrical machine of claim 1, each of said plates being disk-shaped end of a planar configuration.

* * * * *